US009922364B1

(12) United States Patent
Chen et al.

(10) Patent No.: US 9,922,364 B1
(45) Date of Patent: Mar. 20, 2018

(54) VOICE INITIATED PURCHASE REQUEST

(71) Applicant: X Development LLC, Mountain View, CA (US)

(72) Inventors: Charles Chen, San Francisco, CA (US); Rakesh Yadav, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 960 days.

(21) Appl. No.: 14/082,245

(22) Filed: Nov. 18, 2013

(51) Int. Cl.
*G06Q 40/00* (2012.01)
*G06Q 30/06* (2012.01)

(52) U.S. Cl.
CPC .............................. *G06Q 30/0635* (2013.01)

(58) Field of Classification Search
None
See application file for complete search history.

(56) References Cited

U.S. PATENT DOCUMENTS

| 5,758,322 | A | 5/1998 | Rongley |
| 7,974,714 | B2 | 7/2011 | Hoffberg |
| 2003/0120626 | A1* | 6/2003 | Piotrowski ........ G06F 17/30663 |
| 2012/0284105 | A1* | 11/2012 | Li ........................... G06Q 30/06 705/14.23 |
| 2013/0046637 | A1 | 2/2013 | Slutsky et al. |

* cited by examiner

Primary Examiner — Russell S Glass
(74) Attorney, Agent, or Firm — McDonnell Boehnen Hulbert & Berghoff LLP

(57) ABSTRACT

Methods are described herein related to enabling users to purchase a product or service by providing a voice request and/or an image. An example method may involve: (a) receiving, by a hybrid response system ("HRS"), a first speech-segment message that comprises a speech segment and is associated with a user-account, (b) the HRS determining that the speech segment indicates a purchase request, (c) the HRS determining a target product/service based on at least the purchase request, (d) the HRS determining a confidence level associated with a purchase of the target product/service, (e) if the confidence level is greater than or equal to a threshold level, then the HRS sending a purchase order, via the associated user-account, for the target product or service, otherwise, the HRS sending the purchase request and the target product/service to at least one guide computing system to facilitate a response to the purchase request.

21 Claims, 12 Drawing Sheets

VOICE INITIATED PURCHASE REQUEST

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

As computing devices become smaller and more portable, traditional input devices such as keyboards, mice, and even touchscreens, may not be as feasible as they once were. As such, speech-based interfaces are becoming an increasingly popular way of allowing users to interact with their computing devices. Speech-based interfaces may be particularly useful on devices such as head-mountable displays (HMDs) and mobile phones, where other types of user-input devices and/or other modalities of user input may be limited, or may not even be feasible.

SUMMARY

Example embodiments may relate to enabling users to purchase a product or service via a voice request that is sent to a hybrid human and computer-automated response system. More specifically, example embodiments may be implemented in the context of a hybrid response system, which is configured to provide responses to voice requests that are sent from a client device, such as a head-mountable device. The hybrid response system may provide an automated identification of a target product or service in response to the voice request. Alternatively, the hybrid response may determine that human assistance is needed to complete a response to the voice request, in which case the voice request may be sent to one or more guide computing devices that facilitate a human-assisted response. In either case, an image may also be provided to the hybrid response system, where the image may be of at least a portion of the target product, an advertisement, a product label, product packaging, and/or a UPC bar code to facilitate a response to the purchase request. Once a target product or service has been identified, a purchase order may be sent via the user-account associated with the voice request.

In one aspect, a method includes: (a) receiving, by a computing system, a first speech-segment message, wherein the first speech-segment message comprises a speech segment, and wherein the first speech-segment message is associated with a user-account, (b) determining, by the computing system that the speech segment indicates a purchase request, (c) determining, by the computing system, a target product or service based on at least the purchase request, (d) determining, at the computing system, a confidence level associated with a purchase of the target product or service, (e) if the confidence level is greater than or equal to a threshold level, then the computing system sending a purchase order, via the associated user-account, for the target product or service; and otherwise, if the confidence level is less than the threshold level, then the computing system sending the purchase request and the target product or service to at least one guide computing system to facilitate a response to the purchase request by the at least one guide computing system.

In another aspect, a method includes: (a) receiving, by a client device, a first speech segment, wherein the first speech segment comprises a purchase request, wherein the client device is associated with a user-account, (b) receiving an image, by a client device, wherein the image comprises at least one target-product-or-service detail, (c) determining, by the client device, a target product or service based on at least the purchase request, (d) determining, by the client device, a confidence level associated with a purchase of the target product or service, and (e) if the confidence level is greater than or equal to a threshold level, then the client device sending a purchase order, via the associated user-account, for the target product or service, and otherwise, if the confidence level is less than the threshold level, then (i) the client device sending a purchase-request message comprising the purchase request and the image, (ii) the client device receiving a target-product-or-service identification message comprising a second target product or service, and (iii) the client device sending a purchase order for the second target product or service.

In a further aspect, a non-transitory computer-readable medium is provided. The non-transitory computer readable medium is configured to store program instructions that, when executed by a processor, cause the processor to carry out functions comprising: (a) receiving, by a computing system, a first speech-segment message, wherein the first speech-segment message comprises a speech segment, and wherein the first speech-segment message is associated with a user-account, (b) determining, by the computing system that the speech segment indicates a purchase request, (c) determining, by the computing system, a target product or service based on at least the purchase request, (d) determining, at the computing system, a confidence level associated with a purchase of the target product or service, (e) if the confidence level is greater than or equal to a threshold level, then the computing system sending a purchase order, via the associated user-account, for the target product or service; and otherwise, if the confidence level is less than the threshold level, then the computing system sending the purchase request and the target product or service to at least one guide computing system to facilitate a response to the purchase request by the at least one guide computing system.

Further example embodiments may include: (a) means for receiving, by a computing system, a first speech-segment message, wherein the first speech-segment message comprises a speech segment, and wherein the first speech-segment message is associated with a user-account, (b) means for determining, by the computing system that the speech segment indicates a purchase request, (c) means for determining, by the computing system, a target product or service based on at least the purchase request, (d) means for determining, at the computing system, a confidence level associated with a purchase of the target product or service, (e) if the confidence level is greater than or equal to a threshold level, then means for the computing system sending a purchase order, via the associated user-account, for the target product or service; and otherwise, if the confidence level is less than the threshold level, then means for the computing system sending the purchase request and the target product or service to at least one guide computing system to facilitate a response to the purchase request by the at least one guide computing system.

These as well as other aspects, advantages, and alternatives will become apparent to those of ordinary skill in the

DETAILED DESCRIPTION

Figure 1:
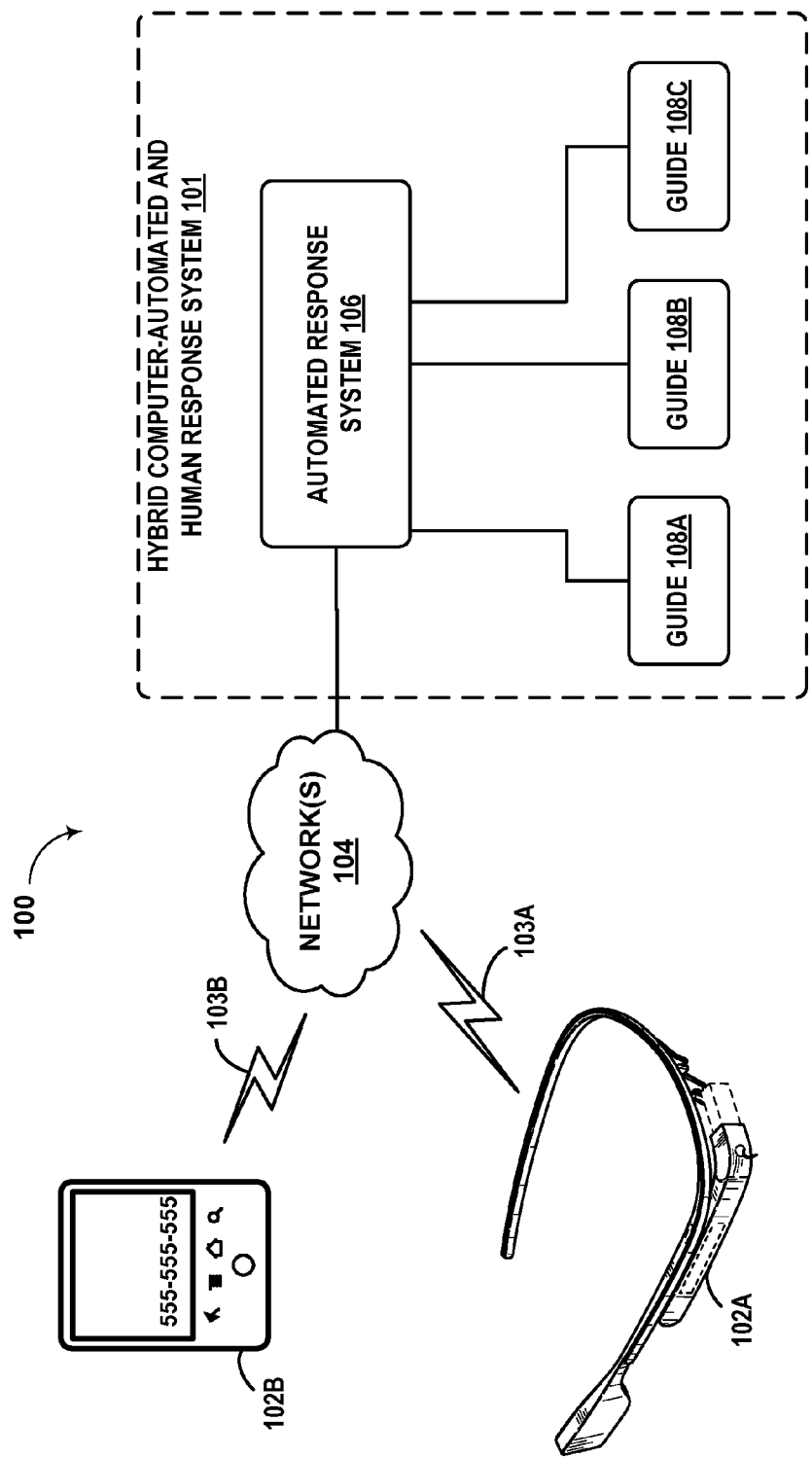
FIG. 1 is a block diagram illustrating components of a system, in which an example embodiment may be implemented.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Example methods may help to make the process of purchasing goods or services easier for consumers via a hybrid response system that can use computer-automated purchasing processes and can enlist the help of a human guide where appropriate, in order to make purchases on behalf of a consumer.

For example, a user may speak a command or request (i.e., a speech segment) that is interpreted as being a purchase request or a "buy for me" request. The voice request may be spoken and detected by the user's computing device, such as by a head-mountable display (HMD). The voice request may then be analyzed to determine whether an automated response system may accurately determine the product or service the user would like to purchase. For instance, a confidence metric associated with a product or service may be determined by an automated response system. If the confidence metric is above a given threshold, the purchase may be executed automatically on behalf of the user.

If a product or service cannot be automatically determined or if the result is too uncertain, the voice request may be sent to a human guide to assist in carrying out the purchase. If the user has given permission for certain user information to be utilized by the hybrid response system, the guide may be given access to particularized user information to facilitate determining what product or service to buy. For instance, the user may provide preferred shipping methods, preferred retailers, cost versus quality preferences, color preferences, and so on. The guide may also be given access to past purchases by the user, which may help the guide interpret the user's current request.

In situations in which the methods and systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

User information that facilitates the sending of orders may be stored as well in a user-account associated with voice requests. For instance, a user may provide passwords, credit card information, shipping information, and so on. This information may be sent with the order after an appropriate product is determined (whether by an automated response system, by a human guide, or by a combination of the two). Users may be given the option to allow access to their information or to certain pieces of their information. Additionally, the user may be prompted to confirm the purchase before it is finalized, or the user may be given the option to automate the entire process.

As an example, a user may say "Buy a cooler for me that can hold twenty-four cans of soda and that has wheels." Further, user information for the requesting user may indicate a default shipping address, a preferred shipping carrier, and information for several of the user's credit cards and an order of preference for using the cards. In an example scenario, this request may be forwarded to a human guide who is provided a guide user interface (UI) that displays the user information and the voice request. The guide may find an appropriate cooler model, search for the lowest price for the model, determine a shipping method with the user's preferred carrier, and purchase the cooler from an appropriate vendor. The purchase may be conducted with the user's provided credit card information and shipped to the user's default shipping address.

In some examples, the process of identifying a target product or service and purchasing the target product or service may be separated. For instance, the user may first be able to determine an appropriate target product or service for a particular request. Finding a target product or service may be accomplished through a series of queries, possibly with the help of a human guide. The user may then have the option to issue a separate purchase request after a product or service has been found or continue searching for an alternative product or service.

II. HYBRID COMPUTER-AUTOMATED AND HUMAN RESPONSE SYSTEMS

FIG. 1 is a block diagram illustrating components of a system 100, in which an example embodiment may be implemented. System 100 includes a Hybrid Computer-Automated and Human Response System 101 (which may be referred to simply as a "hybrid response system"), client devices 102A and 102B, and one or more communication networks 104.

A client device such as client device 102A or 102B may take various forms, such as a mobile phone, a tablet computer, laptop computer, a desktop computer, or a wearable computer, among other possibilities. In the illustrated example, client device 102A is a head-mountable device (HMD), and client device 102B is a smartphone. Further, client devices 102A and 102B may be configured to communicate with other devices via one or more communication networks 104 via respective communication links 103A and 103B.

Provided with network connectivity, a client device 102A or 102B may communicate with a hybrid response system 101. Further, client devices 102A and 102B may each be configured to receive voice input, and to generate or extract speech segments from the voice input. Further, client devices 102A and 102B may send potentially-actionable-speech messages, which include such speech segments, to hybrid response system 101 via one or more networks 104, such as the Internet, a cellular network, and/or a service provider's network.

Note that herein, the term "speech segment" may refer to an audio segment that includes speech by a user of a client device 102A or 102B, or to the speech-to-text transcription of such speech, or possibly to a combination of an audio segment with speech and a speech-to-text transcription of such speech. Thus, a potentially-actionable-speech message may include an audio segment that includes speech by a user of a client device 102A or 102B, and/or may include a speech-to-text transcription of the speech in such an audio segment. A potentially-actionable-speech message may also include other information, such as context information related to the client device and/or a user-account that is currently associated with the client device, for instance.

A client device 102A or 102B may provide various interface features that allow a user to interact with a hybrid response system 101. For instance, HMD 302A may allow a user to provide an explicit indication that the user is about to provide speech that should be sent to the hybrid response system 101 in a potentially-actionable-speech message. As an example, when the user taps and holds a touchpad on HMD 302A, and subsequently speaks, the subsequent speech may be captured as a speech segment and sent to the hybrid response system in a potentially-actionable-speech message. Note that in this example, the HMD 302A may be configured to record speech after the user removes their finger from the touchpad, or may capture speech that occurs while still the user holds their finger on the touchpad. Client devices 102A and 102B may also be configured to detect speech segments for potentially-actionable-speech messages without explicit input from the user; for example, by detecting words, a phrase, or phrases in speech that are deemed to be potentially actionable.

In an example embodiment, the components of hybrid response system 101 include an automated response system 106 and guide computing systems 108A to 108C. Hybrid response system 101 and/or the components thereof may be implemented in one or more computing clusters that are associated with an information-provider service. For example, the automated response system 106 may include one or more computing systems that are configured to receive potentially-actionable-speech messages that are sent by client devices, and to analyze and potentially respond to such messages.

In a further aspect, automated response system 106 may apply one or more machine-learning response processes to a speech segment, in order to determine one or more potential responses to the speech segment. (Note that a machine-learning response process may also be referred to as an artificial intelligence (AI) process.) A potential response that is generated by such an AI response process may be considered an "automated" response, since it is generated by a computing system, without the assistance of human input. Note that other automated response process, which do not involve AI or machine-learning, are also possible.

Automated response system 106 may be further configured to determine a confidence measure for each potential response that is generated by an automated response process. Further, automated response system 106 may be configured to determine if the confidence measure for a potential response satisfies certain criteria (e.g., exceeds a threshold) and, if the criteria are satisfied, to select the potential response as a response to the actionable-speech message. Further, when there is acceptable confidence in an automated response, automated response system 106 may be configured to send the automated response to the client device 102A or 102B from which the corresponding actionable-speech message was received.

If automated response system 106 cannot determine an automated response to a potentially-actionable-speech message with an acceptable level of confidence, then automated response system 106 may be configured to send the potentially-actionable-speech message, and/or a message containing information derived therefrom, to one or more guide computing systems 108A to 108C. Note that automated response system 106 and guide computing systems 108A to 108C may be part of a service provider's network, and may communicatively connected via wired or wireless links. Alternatively, some or all guide computing systems 108A to 108C may not be part of the service provider's network. For example, third party individuals who are pre-qualified as guides may connect to automated response system 106 via their home computers. In such an embodiment, automated response system 106 and guide computing systems 108A to 108C may communicate via one or more networks 104, such as the Internet and/or a cellular network.

Each guide computing system 108A to 108C may provide an interface via which a human can provide input. Such human input may be used to generate a response to a potentially-actionable-speech message that was sent from a client device 102A or 102B.

For example, a guide computing system 108A to 108C may include or be connected to a graphic display on which the guide computing system can display a graphical user interface (GUI) that facilitates a human-assisted response to a potentially-actionable-speech message. Such a GUI may include the text of a speech segment and/or other information that may facilitate taking an action related to the speech segment. The GUI may include features that prompt and/or receive human input, such as text and/or speech, via which a human guide can provide a response and/or information that may be used to generate a response. The GUI may also include interactive features (e.g., buttons, check boxes, drop-down menus, etc.) via which a human guide can provide a response and/or information that may be used to generate a response. Further, the GUI may include an interactive feature or features via which a human guide can indicate that a response is acceptable and should be sent to the client device 102A or 102B.

In some embodiments, the GUI may include a feature or features that provide a guide with context information that a user has elected to make available via a user-account with the hybrid response system 101. For example, if a user has consented to use of certain information by the hybrid response system 101 (and associated human guides), such as location information, calendar information, contact information, information related to past interactions with contacts, and/or past use of certain applications, such information may selectively be provided in the GUI when the user sends a potentially-actionable speech message from their client device, in order to assist a guide in providing a personalized response.

Further, in some cases, a user may link other user-accounts to the user's account with the hybrid response system 101. For example, a user could link their email accounts, social-network accounts, and/or other types of user-accounts, to their user-account with the hybrid response system 101. In this scenario, a user may elect to allow full or partial access to such accounts to the hybrid response system (and possibly to associated human guides as well). If the user elects to provide access to such a linked account, then the GUI may include information obtained via the linked user-account, and/or may include a feature that allows a guide to access the linked user-account.

Generally, note that in situations where the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In a further aspect of some embodiments, a guide computing system 108A to 108C may provide a GUI or another type of interface via which a human guide can send a communication to and/or establish a communication session with a client device 102A or 102B to which the guide is providing a response. For example, a guide computing system 108A to 108C may include an interface that allows a human guide to initiate a phone call to a client device 102A or 102B, initiate and/or engage in a text-based chat session with a client device 102A or 102B, send a text message (e.g., an SMS or MMS message) to a client device 102A or 102B, and/or send an e-mail to a client device, among other possibilities. Provided with such an interface, a guide may send a message or initiate a communication session to, e.g., request additional information to facilitate and/or improve the quality of a response.

In the illustrated example, communication links 103A and 103B are wireless links. For example, a client device 102A or 102B may establish and communicate via a respective communication link 103A or 103B using a wireless communication protocol, such as Bluetooth® radio technology, communication protocols described in IEEE 802.11 (including any IEEE 802.11 revisions), and/or cellular communication protocols (such as GSM, CDMA, UMTS, EV-DO, WiMAX, or LTE), among other possibilities. Note, however, that a client device 102A or 102B may additionally or alternatively be configured for network communications over one or more wired connections. For example, a communication link 103A or 103B may be a wired serial bus such as a universal serial bus or a parallel bus. A wired connection may be a proprietary connection as well, or may take other forms.

Variations on the system 100 illustrated in FIG. 1, and/or variations on the functionality attributed to components of system 100, are possible. For instance, multiple components may be combined in the same entity. As an example, a system may include more or less guide computing systems than shown in FIG. 1. Further, any component that is illustrated in FIG. 1 may be divided into two or more components that collectively provide the described functionality. Other variations from the illustrated examples are also possible.

Figure 2:
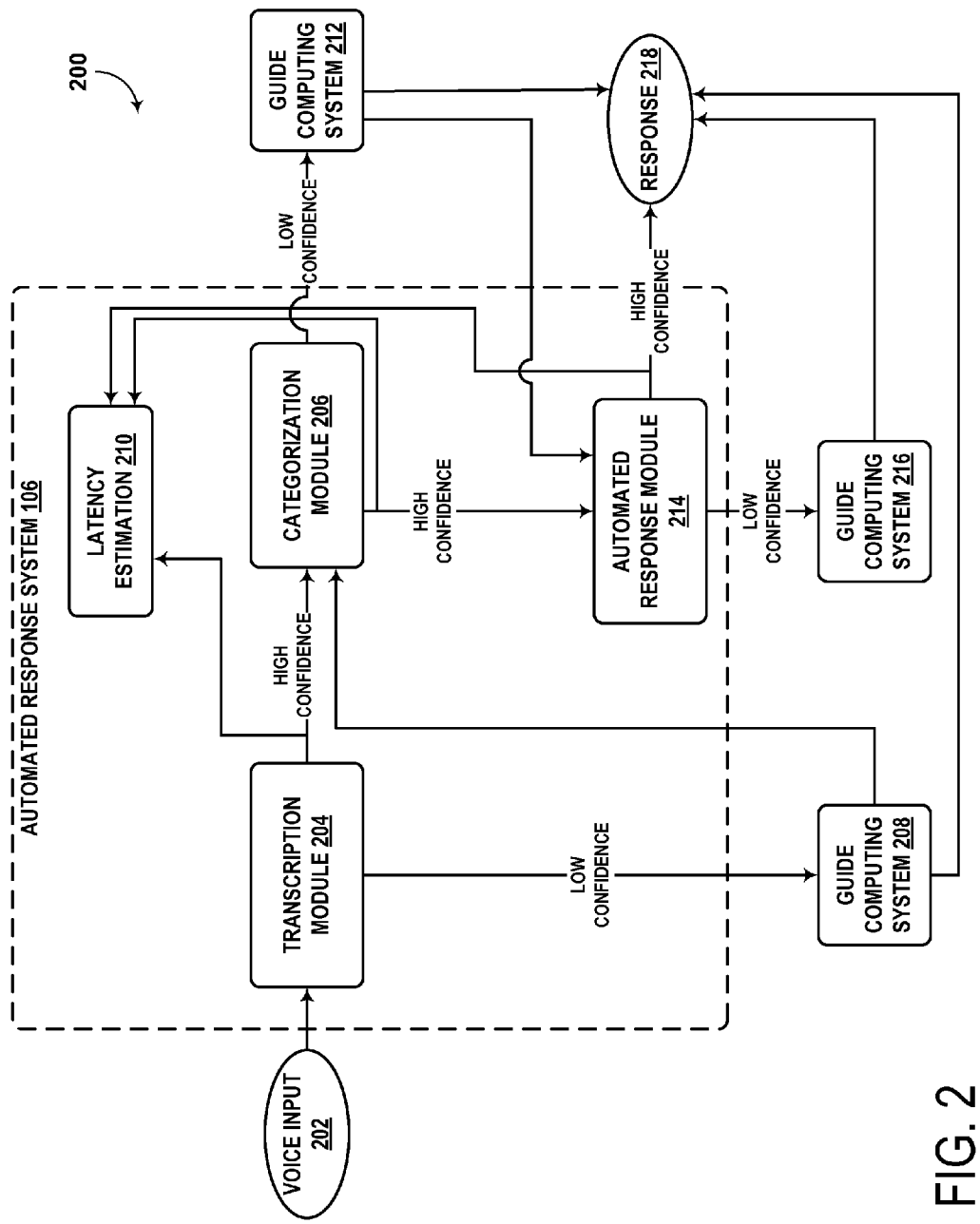
FIG. 2 is a block diagram showing functional components of a system, according to an example embodiment.

FIG. 2 is a block diagram showing functional components of a system 200, according to an example embodiment. Collectively, the components of system 200 may function to receive voice input (e.g., a speech segment), and to provide either an automated response or a human-assisted response to the question.

More specifically, voice input 202 may be received by a transcription module 204, which applies a speech-to-text process to generate text corresponding to the voice input 202. Further, transcription module 204 may analyze whether the corresponding text is an accurate transcription of the voice input 202. In particular, the transcription module 204 may determine a translation confidence measure that indicates how likely it is that the corresponding text is an accurate transcription. If the translation confidence measure exceeds a threshold, then the transcription module 204 may send the generated text to a categorization module 206. If the translation confidence measure is lower (e.g., less than a threshold), then the transcription module 204 may send the text (and possibly audio data that includes some or all of the voice input 202) to a guide computing system 208. Further, in some embodiments, if the confidence measure is very low (e.g., indicative of audio that does not include human speech), the transcription module 204 may discard the text without taking any further action.

The guide computing system 208 may provide an interface that facilitates evaluation of the generated text by a human guide. In particular, such an interface may allow a human guide to indicate whether or not the text is an accurate translation. Further, such an interface may allow the guide to edit the text such that it is more accurate transcription of the voice input. In the event that a human guide indicates that the text is an accurate transcription, and/or edits the text such that it is an accurate transcription, the guide computing system 208 may send the text to categorization module 206. Additionally or alternatively, and regardless of whether the text is an accurate transcription, the guide computing system 208 may provide an interface that allows the human guide to indicate that the text does not include a question to which a response can be provided, and thus should be discarded instead of being sent to categorization module 206.

The transcription module 204 or the guide computing system 208 may thus be the component that outputs a potentially-actionable-speech message in which the speech segment includes text (and possibly an audio version of the text as well). As such, the transcription module could be implemented at a client device, or could be implemented as part of a service-provider's system. Alternatively, if the transcription module 204 is implemented as part of a service provider's network, the transcription module may receive and analyze a potentially-actionable-speech message that is sent from a client device. Further, the potentially-actionable-speech message may be sent to the categorization module 206 for further evaluation.

Categorization module 206 may analyze whether the received text includes speech to which a response can be provided (e.g., whether the speech segment is, in fact, "actionable"). In particular, the categorization module 206 may determine an actionable-speech confidence measure that indicates how likely it is that the text constitutes a question, a command, a request, or another type of message that is actionable. If the actionable-speech confidence measure exceeds a threshold, then the categorization module 206 may generate an actionable-speech message that includes some or all of the text, and send the actionable-speech message to an automated response module 214.

Note that actionable speech segments may take various forms. For example, an actionable speech segment may be a question, such as "where can I get lunch right now?" An actionable speech segment could also be a command or an instructions, such as "buy those shoes for me." An actionable speech segment may take other forms as well. Further, while an actionable speech segment could make the desired response explicit, responsive actions may also be inferred from the speech segment and/or context information related to the client device and/or user-account associated with the speech segment.

In a further aspect, categorization module 206 may classify an actionable-speech message in various ways. For instance, categorization module 206 may determine that a speech segment is of a particular type, relates to certain topic, and/or that providing a response to a speech segment in the message has a certain difficulty level, among other possibilities. Accordingly, such classifications may be indicated in an actionable-speech message that is sent to automated response module 214.

If the actionable-speech confidence measure is lower (e.g., less than a threshold), then the categorization module 206 may send the generated text to a guide computing system 212. The guide computing system 212 may provide an interface that facilitates evaluation of the text by a human guide. In particular, the guide computing system 212 may provide an interface via which a human guide can indicate whether or not the text includes a question, and possibly edit the question such that it is more understandable. Further, the guide computing system 212 may provide an interface for classifying actionable speech segments in the same or a similar manner as a categorization module 206. Alternatively, once a human guide indicates that the text is actionable, the guide computing system 212 may send the text back to the categorization module 206, which may classify the speech segment and/or generate and send an actionable-speech message to automated response module 214.

Automated response module 214 may function to apply one or more automated processes to a given actionable-speech message, such as AI or machine-learning processes. Each automated process may output a response to the actionable-speech message, and a confidence score (i.e., a measure of confidence) indicating a confidence that the response is correct. If the confidence score for a response from one AI process is above a threshold at which the response is considered to be correct (e.g., greater than 99% confidence in the response), then this automated response may be selected as the response to the question, and sent to the corresponding client device.

Note that in some cases, there may be multiple responses having a confidence score that is above the threshold where the response is considered to be correct. In this scenario, one of the "correct" responses may be selected and sent to the client device. For example, the correct response having the highest confidence score may be selected, or one of the correct responses may be selected at random. As another example, automated response module 214 may send some or all of the correct responses to a guide computing system 216 for evaluation by a human guide, who can then select one correct response. Other techniques for selecting a response from multiple correct responses are possible.

If no automated response to an actionable-speech message has a confidence score above the threshold for a "correct" response, then automated response module 214 may forward the actionable-speech message to a guide computing system 216. The guide computing system 216 may present the speech segment from the actionable-speech message and/or other information included in or derived from the actionable-speech message to a human guide. Further, guide computing system 216 may provide an interface that allows a human guide to indicate a response, provide information from which a response may be generated, and/or initiate a responsive action.

In some embodiments, automated response module 214 may evaluate the confidence score or scores for automated responses in a more granular way. For instance, automated response module 214 may classify responses with one of three confidence levels: a high-confidence level (e.g., greater than 99% confidence), a medium-confidence level (e.g., 80-98% confidence), and a low-confidence level (e.g., less than 80%). If one or more automated responses are categorized as high-confidence responses, then automated response module 214 may initiated an automated response.

If there is no high-confidence automated response, then the information that is sent to the guide computing system may vary depending upon the confidence level or levels of the automated responses. For example, if all the automated responses have a low confidence level, then automated response module 214 may simply send the actionable-speech message to a guide computing system 216. However, if some or all of the automated responses have a medium-confidence level, then automated response module 214 may send the actionable-speech message and the medium-confidence responses to the guide computing system 216. The guide computing system 216 may then provide an interface that allows a human guide to quickly select one of the medium-confidence responses as the correct response. Such an interface may also include features that allow a guide to provide a response as they otherwise would, if the guide believes that none of the medium-confidence responses are correct.

Note that the feature of forwarding automated responses to guide computing systems may be applied in implementations other than those described above. In particular, when automated response module 214 determines that a guide computing system 216 should make the ultimate decision as to the correct response, automated response module 214 may send any response that was determined by one of its AI processes to the guide computing system 216 for consideration by a human guide. In order to facilitate a quicker response, automated response module 214 may limit the number of automated responses that are sent to the guide computing system 216 for consideration. However, automated response module 214 could theoretically send any number of automated responses to a guide computing system 216 for consideration.

Note that a response 218 may take various forms. For example, response 218 may be content that is sent to a client device associated with the actionable-speech message. Such a response 218 may include text, hyperlinks, graphic content, and/or other types of information that can be presented on a client device. A response 218 may also be a responsive action. For example, an AI process or guide computing system may response to an actionable-speech message by purchasing items via an associated user-account, or posting a message via an associated account on a social network (presuming, in both cases, that the user has authorized such functionality). Other examples of responsive actions are also possible. Further, note that depending upon a user's settings, the user may or may not be notified explicitly (e.g., via e-mail or text message) of such responsive actions.

In a further aspect, automated response module 214 may receive feedback from guide computing systems 208, 212 and/or 216, which may be used to improve the AI processes that are applied to incoming actionable-speech messages. Machine learning processes may then be applied to such feedback, so that the AI processes may improve over time. Note that as such AI processes improve, this may free up human guides to respond to more and more complex questions.

Automated response module 214 may use various types of feedback to improve the one or more AI processes that are applied to incoming actionable-speech messages. For example, when an actionable-speech message is sent to a guide computing system 216, automated response module may be informed of the human-assisted response that was sent to the client device and/or the steps that the human took to determine the response. As another example, each time an automated response is sent to a guide computing system 216 for consideration, automated response module 214 may be informed as to whether or not the automated response was selected as the correct response. As yet another example, when a client device receives an automated response from automated response module 214 or a human-assisted response from guide computing system 216, the client device may send feedback indicating the quality of the response. For instance, feedback from a client device may indicate whether the response provided information they needed, whether or not the response was correct, whether a better response could have been provided, and/or information that might improve future responses to similar questions, among other possibilities.

In a further aspect, system 200 may include a latency estimation module 210. The latency estimation module 210 may evaluate questions and estimate how long it will take for a response to be provided to a client device. Latency estimation module 210 may therefore be configured to send an estimated response-time message to a client device that is awaiting the response. The estimated response time message may indicate an estimated period of time (e.g., 30 seconds) until the client device will receive a response to a question that was sent from the client device. Further, while a client device is awaiting a response, latency estimation module 210 may update the estimated response time, and send estimated response-time message indicating such updates, as new information is received.

In order to estimate and/or update the estimated response time, latency estimation module 210 may receive information from transcription module 204, categorization module 206, automated response module 214, guide computing systems, and/or other sources. For example, latency estimation module 210 may increase or decrease an estimated response time for a actionable-speech message depending on: (a) whether the transcription module 204 has a lower or higher confidence in a transcription, respectively, (b) whether the categorization module 206 has a higher or lower confidence that the received text is actionable, (c) the complexity of the speech segment and/or the type or category of speech segment (e.g., as determined by categorization module 206), and/or (d) whether or not automated response module can provide an automated response with a high enough level of confidence, among other possibilities.

Note that some or all of guide computing systems 208, 212, 216 may be the same guide computing system. Alternatively, different guide computing systems may be utilized for some or all of the guide computing systems that may be involved in providing a response to a particular actionable-speech message.

Further, in some embodiments, all of the modules shown in FIG. 2 may be part of an automated response system 106. In other embodiments, some of the modules shown in FIG. 2 may be implemented at a client device 102A or 102B. For example, transcription module 204 and/or categorization module 206 may be implemented by a client device. Other examples are also possible.

III. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

Figure 3A:
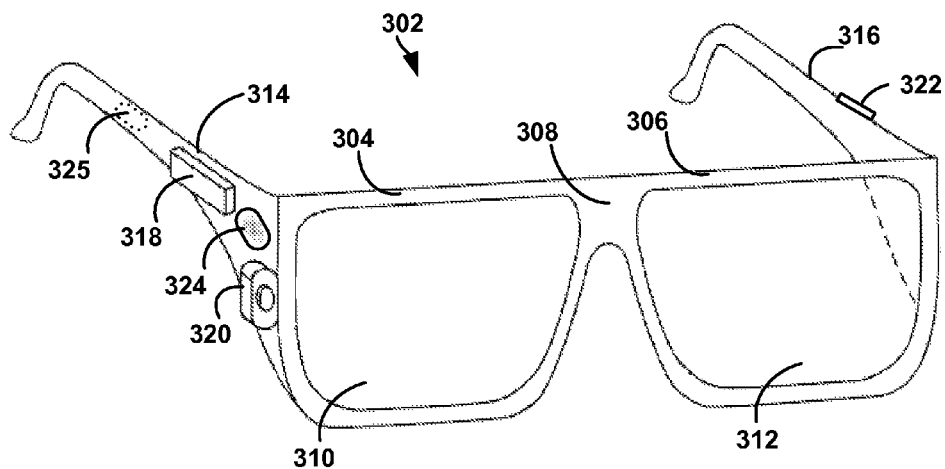
FIG. 3A illustrates a wearable computing system according to an example embodiment.

FIG. 3A illustrates a wearable computing system according to an example embodiment. In FIG. 3A, the wearable computing system takes the form of a head-mountable device (HMD) 302 (which may also be referred to as a head-mounted display). It should be understood, however, that example systems and devices may take the form of or be implemented within or in association with other types of devices, without departing from the scope of the invention. As illustrated in FIG. 3A, the HMD 302 includes frame elements including lens-frames 304, 306 and a center frame support 308, lens elements 310, 312, and extending side-arms 314, 316. The center frame support 308 and the extending side-arms 314, 316 are configured to secure the HMD 302 to a user's face via a user's nose and ears, respectively.

Each of the frame elements 304, 306, and 108 and the extending side-arms 314, 316 may be formed of a solid structure of plastic and/or metal, or may be formed of a hollow structure of similar material so as to allow wiring and component interconnects to be internally routed through the HMD 302. Other materials may be possible as well.

One or more of each of the lens elements 310, 312 may be formed of any material that can suitably display a projected image or graphic. Each of the lens elements 310, 312 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 314, 316 may each be projections that extend away from the lens-frames 304, 306, respectively, and may be positioned behind a user's ears to secure the HMD 302 to the user. The extending side-arms 314, 316 may further secure the HMD 302 to the user by extending around a rear portion of the user's head. Additionally or alternatively, for example, the HMD 302 may connect to or be affixed within a head-mounted helmet structure. Other configurations for an HMD are also possible.

The HMD 302 may also include an on-board computing system 318, an image capture device 320, a sensor 322, and a finger-operable touch pad 324. The on-board computing system 318 is shown to be positioned on the extending side-arm 314 of the HMD 302; however, the on-board computing system 318 may be provided on other parts of the HMD 302 or may be positioned remote from the HMD 302 (e.g., the on-board computing system 318 could be wire- or wirelessly-connected to the HMD 302). The on-board computing system 318 may include a processor and memory, for example. The on-board computing system 318 may be configured to receive and analyze data from the image capture device 320 and the finger-operable touch pad 324 (and possibly from other sensory devices, user interfaces, or both) and generate images for output by the lens elements 310 and 312.

The image capture device 320 may be, for example, a camera that is configured to capture still images and/or to capture video. In the illustrated configuration, image capture device 320 is positioned on the extending side-arm 314 of the HMD 302; however, the image capture device 320 may be provided on other parts of the HMD 302. The image capture device 320 may be configured to capture images at various resolutions or at different frame rates. Many image capture devices with a small form-factor, such as the cameras used in mobile phones or webcams, for example, may be incorporated into an example of the HMD 302.

Further, although FIG. 3A illustrates one image capture device 320, more image capture device may be used, and each may be configured to capture the same view, or to capture different views. For example, the image capture device 320 may be forward facing to capture at least a portion of the real-world view perceived by the user. This forward facing image captured by the image capture device 320 may then be used to generate an augmented reality where computer generated images appear to interact with or overlay the real-world view perceived by the user.

The sensor 322 is shown on the extending side-arm 316 of the HMD 302; however, the sensor 322 may be positioned on other parts of the HMD 302. For illustrative purposes, only one sensor 322 is shown. However, in an example embodiment, the HMD 302 may include multiple sensors. For example, an HMD 302 may include sensors 302 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 324 is shown on the extending side-arm 314 of the HMD 302. However, the finger-operable touch pad 324 may be positioned on other parts of the HMD 302. Also, more than one finger-operable touch pad may be present on the HMD 302. The finger-operable touch pad 324 may be used by a user to input commands. The finger-operable touch pad 324 may sense at least one of a pressure, position and/or a movement of one or more fingers via capacitive sensing, resistance sensing, or a surface acoustic wave process, among other possibilities. The finger-operable touch pad 324 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 324 may be formed of one or more translucent or transparent insulating layers and one or more translucent or transparent conducting layers. Edges of the finger-operable touch pad 324 may be formed to have a raised, indented, or roughened surface, so as to provide tactile feedback to a user when the user's finger reaches the edge, or other area, of the finger-operable touch pad 324. If more than one finger-operable touch pad is present, each finger-operable touch pad may be operated independently, and may provide a different function.

In a further aspect, HMD 302 may be configured to receive user input in various ways, in addition or in the alternative to user input received via finger-operable touch pad 324. For example, on-board computing system 318 may implement a speech-to-text process and utilize a syntax that maps certain spoken commands to certain actions. In addition, HMD 302 may include one or more microphones via which a wearer's speech may be captured. Configured as such, HMD 302 may be operable to detect spoken commands and carry out various computing functions that correspond to the spoken commands.

As another example, HMD 302 may interpret certain head-movements as user input. For example, when HMD 302 is worn, HMD 302 may use one or more gyroscopes and/or one or more accelerometers to detect head movement. The HMD 302 may then interpret certain head-movements as being user input, such as nodding, or looking up, down, left, or right. An HMD 302 could also pan or scroll through graphics in a display according to movement. Other types of actions may also be mapped to head movement.

As yet another example, HMD 302 may interpret certain gestures (e.g., by a wearer's hand or hands) as user input. For example, HMD 302 may capture hand movements by analyzing image data from image capture device 320, and initiate actions that are defined as corresponding to certain hand movements.

As a further example, HMD 302 may interpret eye movement as user input. In particular, HMD 302 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 302 also includes a speaker 325 for generating audio output. In one example, the speaker could be in the form of a bone conduction speaker, also referred to as a bone conduction transducer (BCT). Speaker 325 may be, for example, a vibration transducer or an electroacoustic transducer that produces sound in response to an electrical audio signal input. The frame of HMD 302 may be designed such that when a user wears HMD 302, the speaker 325 contacts the wearer. Alternatively, speaker 325 may be embedded within the frame of HMD 302 and positioned such that, when the HMD 302 is worn, speaker 325 vibrates a portion of the frame that contacts the wearer. In either case, HMD 302 may be configured to send an audio signal to speaker 325, so that vibration of the speaker may be directly or indirectly transferred to the bone structure of the wearer. When the vibrations travel through the bone structure to the bones in the middle ear of the wearer, the wearer can interpret the vibrations provided by BCT 325 as sounds.

Various types of bone-conduction transducers (BCTs) may be implemented, depending upon the particular implementation. Generally, any component that is arranged to vibrate the HMD 302 may be incorporated as a vibration transducer. Yet further it should be understood that an HMD 302 may include a single speaker 325 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 325 can vibrate the wearer's bone structure.

Figure 3B:
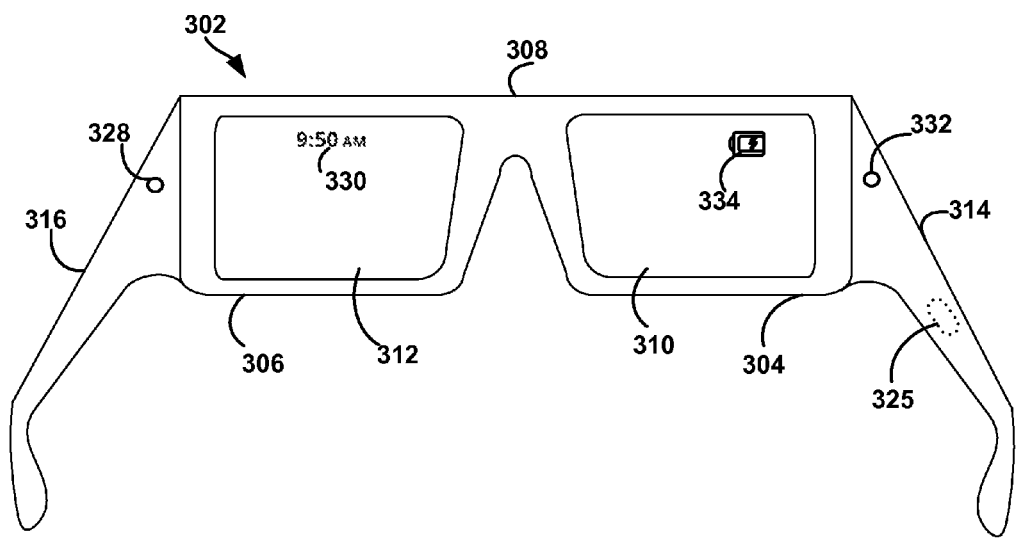
FIG. 3B illustrates an alternate view of the wearable computing device illustrated in FIG. 3A.

FIG. 3B illustrates an alternate view of the wearable computing device illustrated in FIG. 3A. As shown in FIG. 3B, the lens elements 310, 312 may act as display elements. The HMD 302 may include a first projector 328 coupled to an inside surface of the extending side-arm 316 and configured to project a display 330 onto an inside surface of the lens element 312. Additionally or alternatively, a second projector 332 may be coupled to an inside surface of the extending side-arm 314 and configured to project a display 334 onto an inside surface of the lens element 310.

The lens elements 310, 312 may act as a combiner in a light projection system and may include a coating that reflects the light projected onto them from the projectors 328, 332. In some embodiments, a reflective coating may not be used (e.g., when the projectors 328, 332 are scanning laser devices).

In alternative embodiments, other types of display elements may also be used. For example, the lens elements 310, 312 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 304, 306 for driving such a matrix display. Alternatively or additionally, a laser or LED source and scanning system could be used to draw a raster display directly onto the retina of one or more of the user's eyes. Other possibilities exist as well.

Figure 3C:
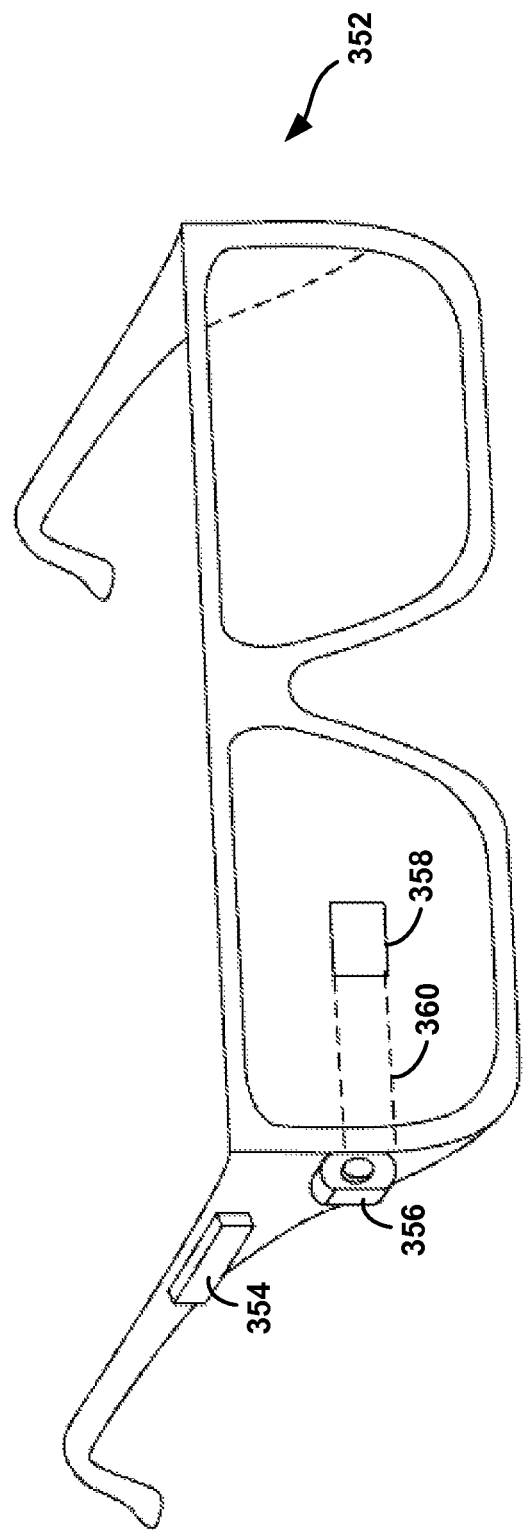
FIG. 3C illustrates another wearable computing system according to an example embodiment.

FIG. 3C illustrates another wearable computing system according to an example embodiment, which takes the form of an HMD 352. The HMD 352 may include frame elements and side-arms such as those described with respect to FIGS. 3A and 3B. The HMD 352 may additionally include an on-board computing system 354 and an image capture device 356, such as those described with respect to FIGS. 3A and 3B. The image capture device 356 is shown mounted on a frame of the HMD 352. However, the image capture device 356 may be mounted at other positions as well.

As shown in FIG. 3C, the HMD 352 may include a single display 358 which may be coupled to the device. The display 358 may be formed on one of the lens elements of the HMD 352, such as a lens element described with respect to FIGS. 3A and 3B, and may be configured to overlay computer-generated graphics in the user's view of the physical world. The display 358 is shown to be provided in a center of a lens of the HMD 352, however, the display 358 may be provided in other positions, such as for example towards either the upper or lower portions of the wearer's field of view. The display 358 is controllable via the computing system 354 that is coupled to the display 358 via an optical waveguide 360.

Figure 3D:
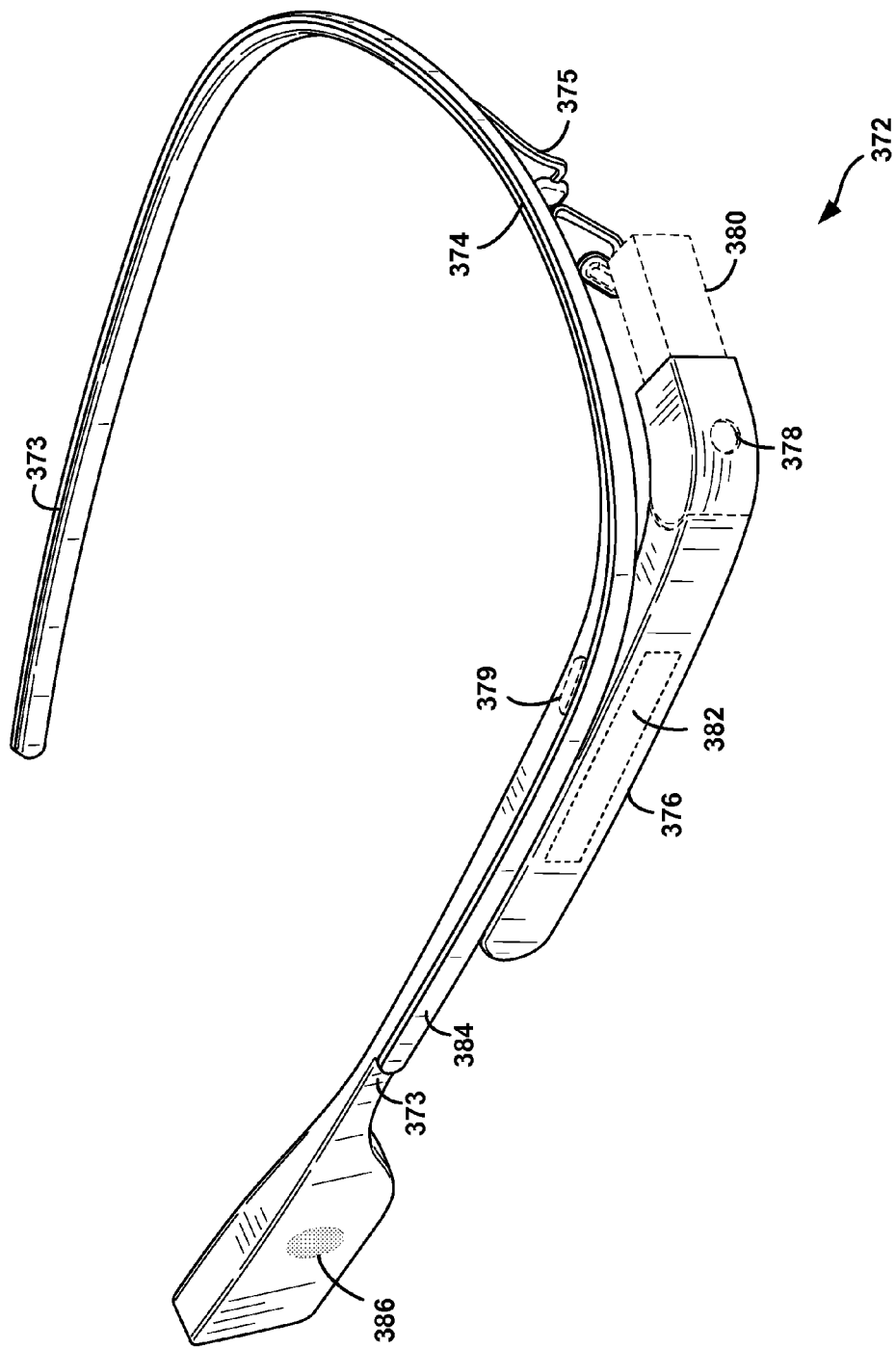
FIG. 3D illustrates another wearable computing system according to an example embodiment.

FIG. 3D illustrates another wearable computing system according to an example embodiment, which takes the form of a monocular HMD 372. The HMD 372 may include side-arms 373, a center frame support 374, and a bridge portion with nosepiece 375. In the example shown in FIG. 3D, the center frame support 374 connects the side-arms 373. The HMD 372 does not include lens-frames containing lens elements. The HMD 372 may additionally include a component housing 376, which may include an on-board computing system (not shown), an image capture device 378, and a button 379 for operating the image capture device 378 (and/or usable for other purposes). Component housing 376 may also include other electrical components and/or may be electrically connected to electrical components at other locations within or on the HMD. HMD 372 also includes a BCT 386.

The HMD 372 may include a single display 380, which may be coupled to one of the side-arms 373 via the component housing 376. In an example embodiment, the display 380 may be a see-through display, which is made of glass and/or another transparent or translucent material, such that the wearer can see their environment through the display 380. Further, the component housing 376 may include the light sources (not shown) for the display 380 and/or optical elements (not shown) to direct light from the light sources to the display 380. As such, display 380 may include optical features that direct light that is generated by such light sources towards the wearer's eye, when HMD 372 is being worn.

In a further aspect, HMD 372 may include a sliding feature 384, which may be used to adjust the length of the side-arms 373. Thus, sliding feature 384 may be used to adjust the fit of HMD 372. Further, an HMD may include other features that allow a wearer to adjust the fit of the HMD, without departing from the scope of the invention.

Figure 3E:
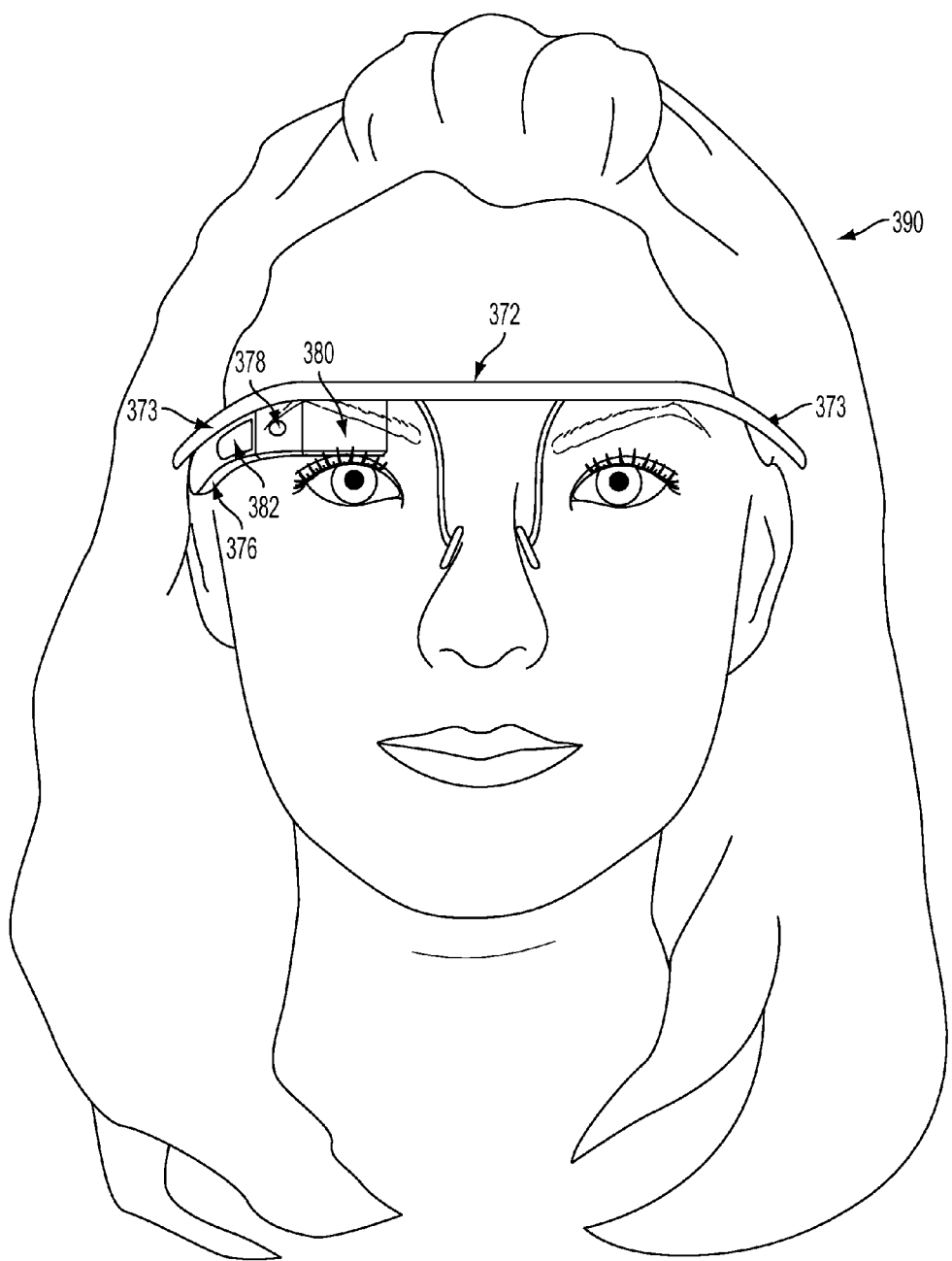
FIGS. 3E to 3G are simplified illustrations of the wearable computing system shown in FIG. 3D, being worn by a wearer.
Figure 3F:
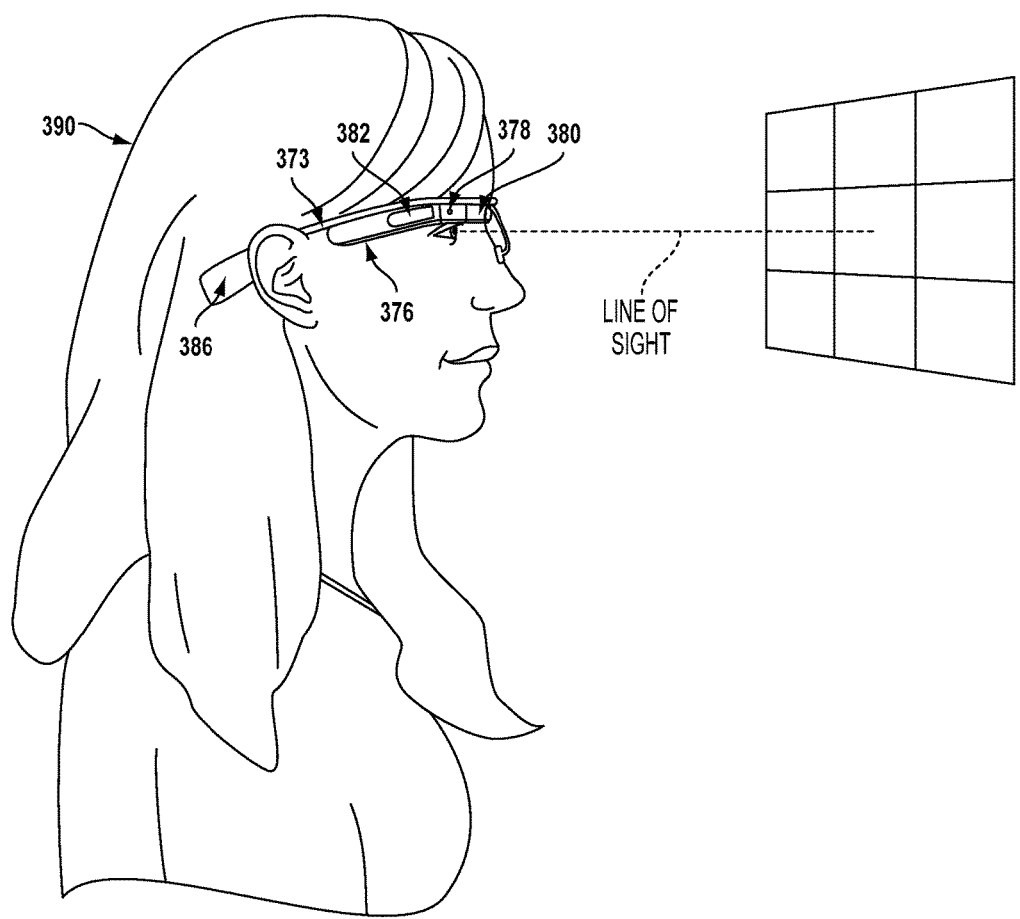
Figure 3G:
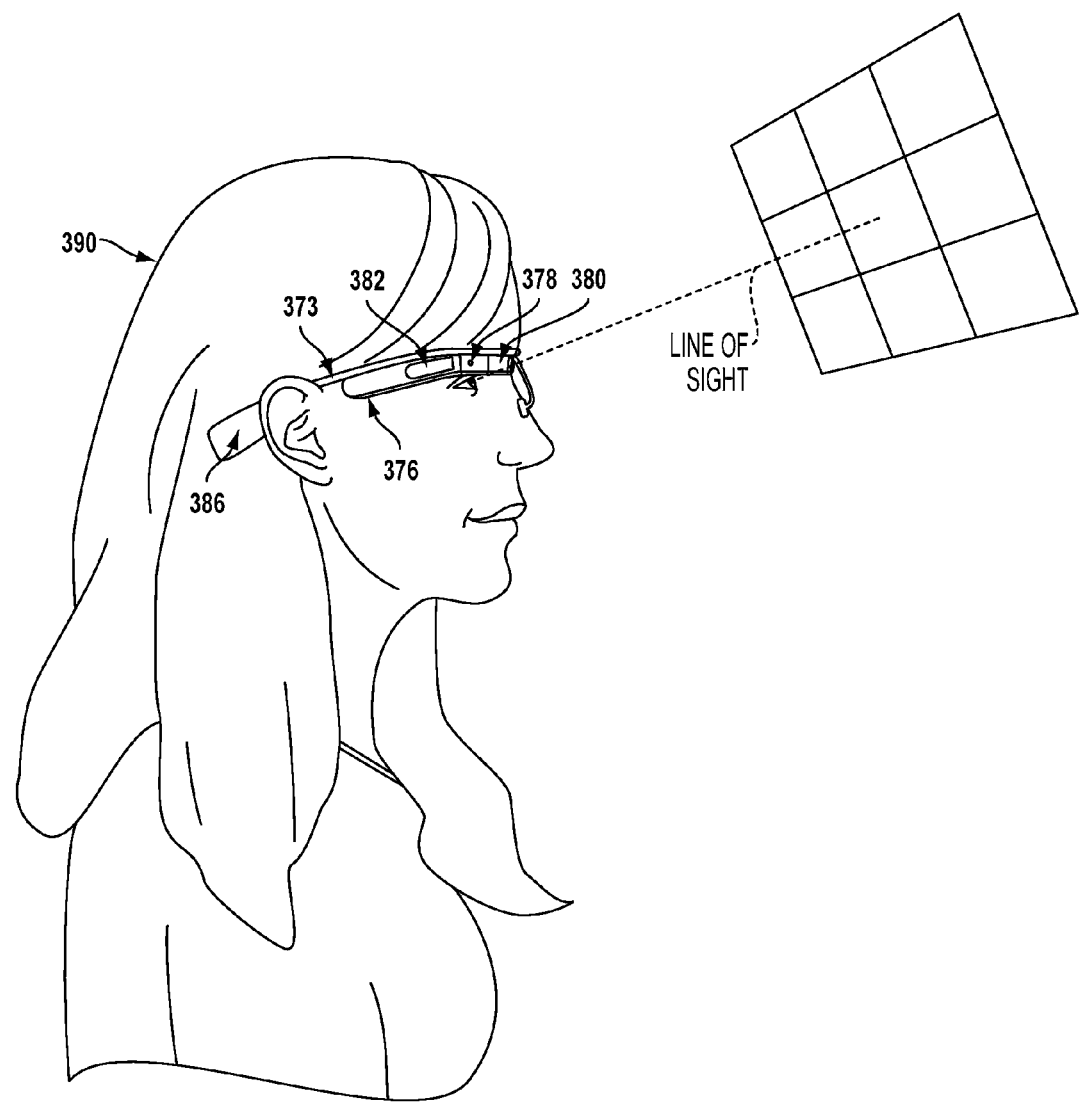

FIGS. 3E to 3G are simplified illustrations of the HMD 372 shown in FIG. 3D, being worn by a wearer 390. As shown in FIG. 3F, when HMD 372 is worn, BCT 386 is arranged such that when HMD 372 is worn, BCT 386 is located behind the wearer's ear. As such, BCT 386 is not visible from the perspective shown in FIG. 3E.

In the illustrated example, the display 380 may be arranged such that when HMD 372 is worn, display 380 is positioned in front of or proximate to a user's eye when the HMD 372 is worn by a user. For example, display 380 may be positioned below the center frame support and above the center of the wearer's eye, as shown in FIG. 3E. Further, in the illustrated configuration, display 380 may be offset from the center of the wearer's eye (e.g., so that the center of display 380 is positioned to the right and above of the center of the wearer's eye, from the wearer's perspective).

Configured as shown in FIGS. 3E to 3G, display 380 may be located in the periphery of the field of view of the wearer 390, when HMD 372 is worn. Thus, as shown by FIG. 3F, when the wearer 390 looks forward, the wearer 390 may see the display 380 with their peripheral vision. As a result, display 380 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 380 is located as shown, the wearer 390 may view the display 380 by, e.g., looking up with their eyes only (possibly without moving their head). This is illustrated as shown in FIG. 3G, where the wearer has moved their eyes to look up and align their line of sight with display 380. A wearer might also use the display by tilting their head down and aligning their eye with the display 380.

Figure 4:
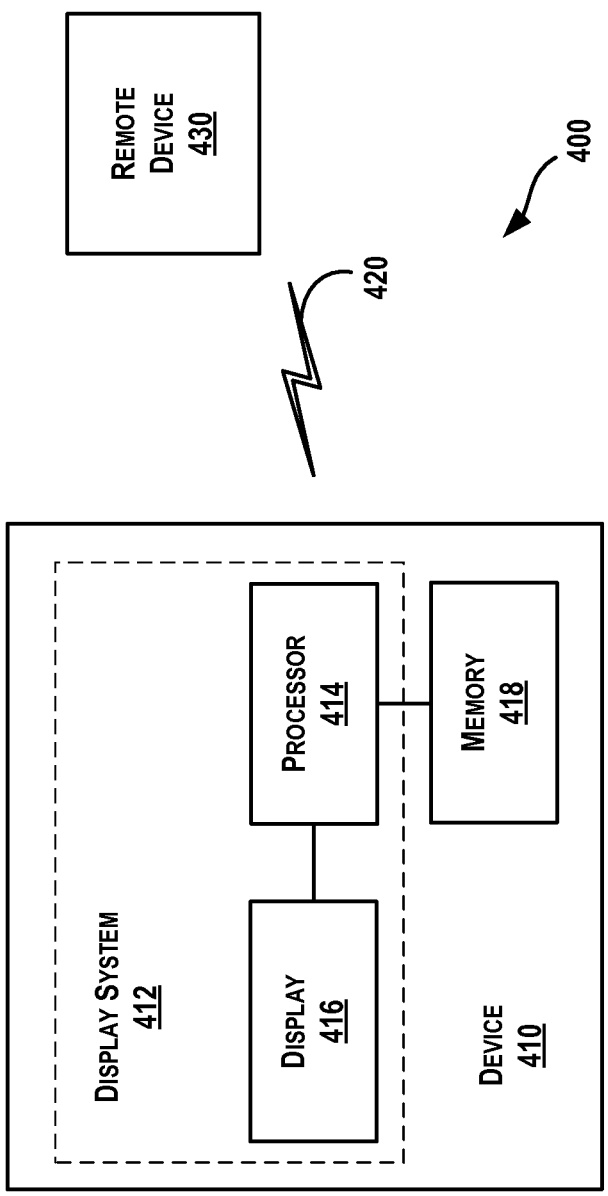
FIG. 4 is a simplified block diagram of a computing device according to an example embodiment.

FIG. 4 is a simplified block diagram a computing device 410 according to an example embodiment. In an example embodiment, device 410 communicates using a communication link 420 (e.g., a wired or wireless connection) to a remote device 430. The device 410 may be any type of device that can receive data and display information corresponding to or associated with the data. For example, the device 410 may take the form of or include a head-mountable display, such as the head-mounted devices 302, 352, or 372 that are described with reference to FIGS. 3A to 3G.

The device 410 may include a processor 414 and a display 416. The display 416 may be, for example, an optical see-through display, an optical see-around display, or a video see-through display. The processor 414 may receive data from the remote device 430, and configure the data for display on the display 416. The processor 414 may be any type of processor, such as a micro-processor or a digital signal processor, for example.

The device 410 may further include on-board data storage, such as memory 418 coupled to the processor 414. The memory 418 may store software that can be accessed and executed by the processor 414, for example.

The remote device 430 may be any type of computing device or transmitter including a laptop computer, a mobile telephone, head-mountable display, tablet computing device, etc., that is configured to transmit data to the device 410. The remote device 430 and the device 410 may contain hardware to enable the communication link 420, such as processors, transmitters, receivers, antennas, etc.

Further, remote device 430 may take the form of or be implemented in a computing system that is in communication with and configured to perform functions on behalf of client device, such as computing device 410. Such a remote device 430 may receive data from another computing device 410 (e.g., an HMD 302, 352, or 372 or a mobile phone), perform certain processing functions on behalf of the device 410, and then send the resulting data back to device 410. This functionality may be referred to as "cloud" computing.

In FIG. 4, the communication link 420 is illustrated as a wireless connection; however, wired connections may also be used. For example, the communication link 420 may be a wired serial bus such as a universal serial bus or a parallel bus. A wired connection may be a proprietary connection as well. The communication link 420 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 430 may be accessible via the Internet and may include a computing cluster associated with a particular web service (e.g., social-networking, photo sharing, address book, etc.).

IV. ILLUSTRATIVE METHODS

Figure 5:
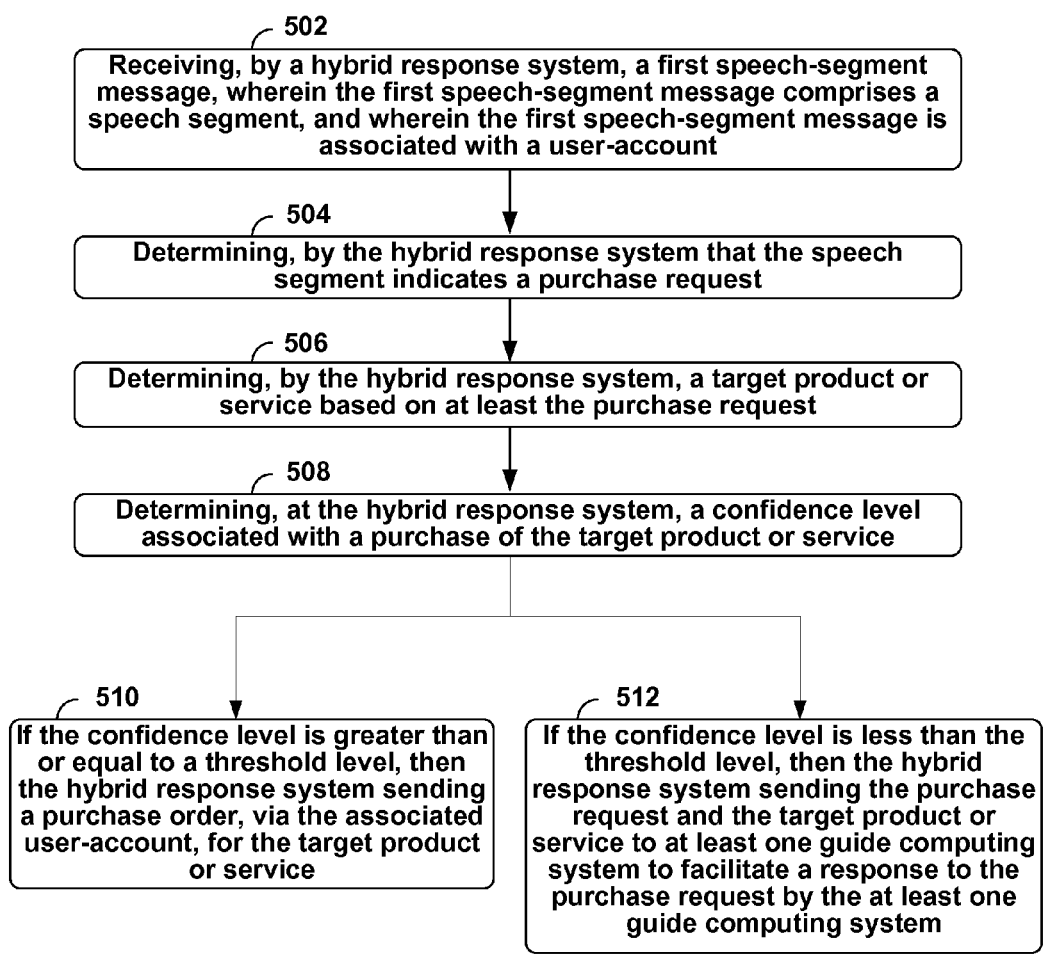
FIG. 5 is a flow chart illustrating a method, according to an example embodiment.

FIG. 5 is a flow chart illustrating a method 500, according to an example embodiment. Method 500 may be carried out to enable users to purchase a product or service via a voice request received by a hybrid response system, where the voice request is associated with a user-account. Method 500 may be carried out by hybrid response system as described above.

Method 500 involves a hybrid response system receiving a first speech-segment message, where the first speech-segment message comprises a speech segment, and where the first speech-segment message is associated with a user-account, as shown by block 502. The hybrid response system determines that the speech segment indicates a purchase request, as shown by block 504. The hybrid response system then determines a target product or service based on at least the purchase request, as shown by block 506, and the hybrid response system determines a confidence level associated with a purchase of the target product or service, as shown by block 508. If the confidence level is greater than or equal to a threshold level, then the hybrid response system sends a purchase order, via the associated user-account, for the target product or service, as shown in block 510. Otherwise, if the confidence level is less than the threshold level, then the hybrid response system sends the purchase request and the target product or service to at least one guide computing system to facilitate a response to the purchase request by the at least one guide computing system, as shown in block 512.

At block 502, the speech segment message may include a request for a purchase or a command to buy a product or a service. For example, a user may state "Buy product X for me," or "Buy service Y for me." In order to help ensure that the request or command is intended, the user may hold down a button or tap-and-hold on a touchpad of the client device before speaking the request (and possibly continuing to press the button or keep their finger on the touchpad for the duration of the voice request), for example. Alternatively, a user may specifically the client device at the beginning of the voice request, for example, "Ok phone, buy product X for me." Other example commands or requests may include "Reserve Hotel X in Hawaii arriving December 1$^{st}$ and departing December 8$^{th}$ for me," "Book a flight to Hawaii for me on airline Y leaving December 1$^{st}$ and returning December 8$^{th}$ for me" or "Rent a four-door sedan for me in Hawaii beginning on December 1$^{st}$ and ending December 8$^{th}$." Accordingly, the target product or service may include consumer goods, gift certificates, plane tickets, hotel reservations, car rentals, among other possibilities.

In some embodiments, at block 512, the at least one guide computing system determines whether the target product or service is responsive to the purchase request. If the target product or service is responsive to the purchase request, then the at least one guide computing system sends a purchase order for the target product or service. Otherwise, if the target product or service is not responsive to the purchase request, the at least one guide computing system determines a second target product or service based on at least the purchase request and the at least one guide computing system sends a purchase order for the second target product or service.

In various embodiments, the method 500 further involves the hybrid response system receiving an image. In this case, at block 506, the hybrid response system determines the target product or service based further on the image, the details of which are further discussed below with respect to FIG. 6.

In some embodiments, block 506 further involves the hybrid response system determining the target product or service further based on one or more predetermined user preferences. The user preferences may be set by the user-account associated with the purchase request or speech segment. These user preferences may include selecting the target product or service based on the lowest price available, specified stores or service providers or preferred brands, among other possibilities.

In other embodiments, the method 500 further involves, at block 506, the hybrid response system determining the target product or service is further based on one or more previous purchases made via the associated user-account. For example, the hybrid response system may determine from previous purchases that a user prefers a certain type of good (e.g., prefers two-ply toilet paper, instead of single-ply), prefers certain brands or prefers to purchase via a certain account associated with the user even if the price is not the lowest for a given product or service. In another example, if the speech segment or request is "Buy a power cord for me," the hybrid response system may determine that the user recently purchased a certain brand of tablet or mobile phone and determine an appropriate model for the target power cord.

In still further embodiments, the method 500 may further involve, at block 506, the hybrid response system determining the target product or service further based on one or more discounts associated with the purchase request. These discounts may include free shipping, online sales, and/or loyalty reward points for shopping at a given store, among other possibilities.

In some embodiments, at block 510 or 512, the purchase order comprises user data from the associated user-account. The user data may include credit card information, a loyalty reward number, a user account number or login details associated with the online store or service provider, shipping preferences (e.g., rush delivery at a cost or free standard delivery and/or a preferred carrier), among other possibilities. In further embodiments, the user data from the associated user-account may be derived from a linked user-account that is a separate purchasing account, such as Google Wallet, that has information stored specifically for purchases (e.g., credit card information, purchase history, purchasing preferences, among other possibilities).

In some embodiments, the method 500 may further involve, at block 506, the at least one guide computing system determining whether the target product or service is responsive to the purchase request comprises sending a target-product-or-service-detail request. Example target-product-or-service-detail requests may include a request for further product or service details, such as clothing size, color, dates for service, among other possibilities.

In other embodiments, method 500 may further involve the hybrid response system sending a purchase-approval request. The purchase-approval request may include an identification of the target product or service, the price of the product or service, the vendor, the price of shipping, the shipping carrier, and/or the estimated arrival date, among other possibilities. If the user is satisfied with the details of the purchase-approval request, the user may then speak a command, such as "buy," that is sent to the hybrid response system.

In some embodiments, method 500 may further involve the hybrid response system sending a confirmation-of-purchase message. The client device receives the confirmation-of-purchase message, which may include a tracking number, a confirmation number, and/or a message indicating the purchase is complete, among other possibilities. In some embodiments, the confirmation-of-purchase message may include a countdown timer allowing the user a window of time in which to cancel or modify the purchase order.

Figure 6:
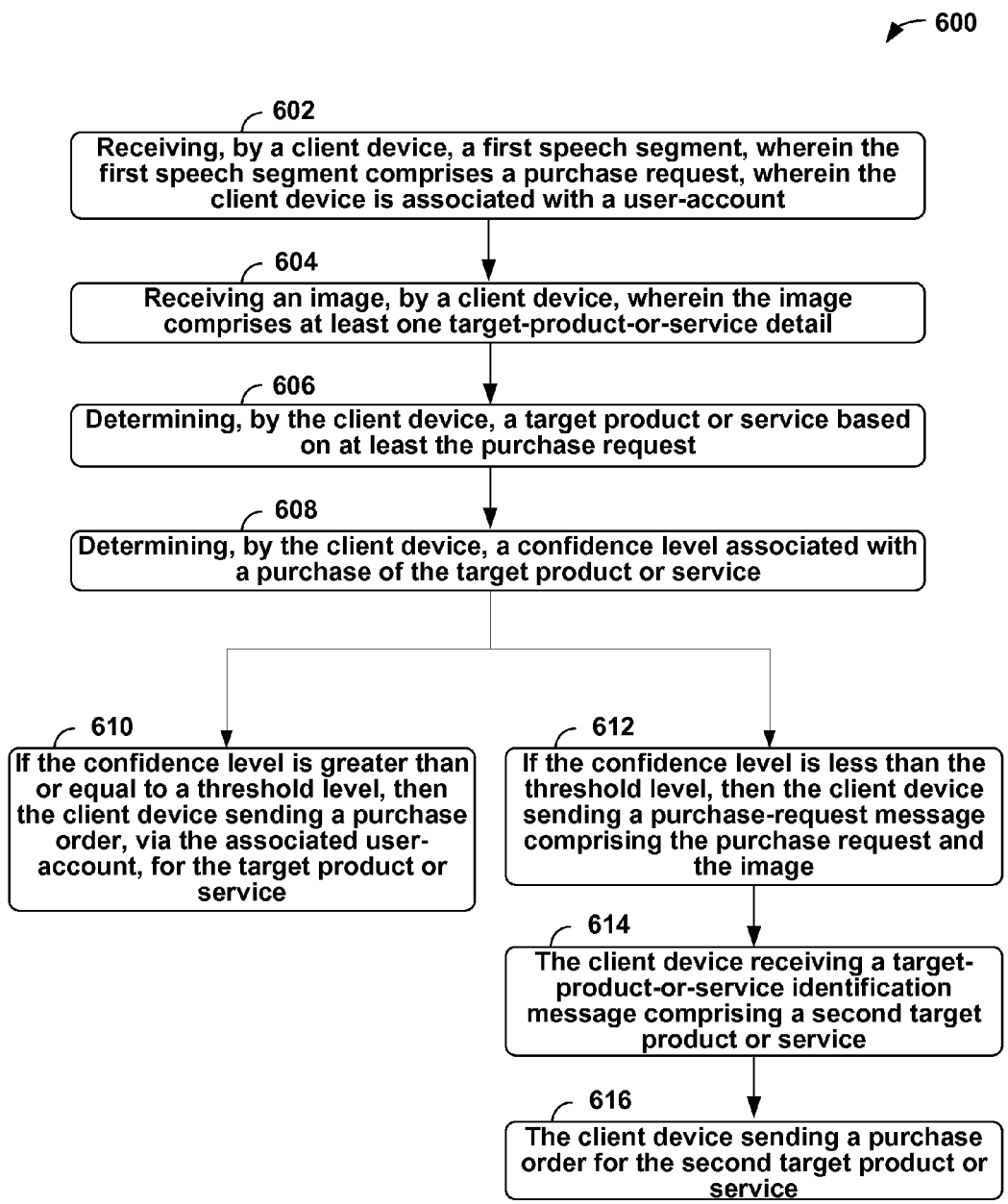
FIG. 6 is a flow chart illustrating a method, according to an example embodiment.

FIG. 6 is a flow chart illustrating a method 600, according to an example embodiment. Method 600 may be carried out to enable users to purchase a product or service via a voice request received by a client device, where the client device is associated with a user-account. For example, method 600 may be carried out by an HMD, or a system therein (e.g., a processor and non-transitory computer readable medium with instructions that are executable to carry out the functionality described herein). Method 600 could be also be carried out by other types of client devices, such as a mobile phone, tablet computer, or personal computer, among other possibilities.

Method 600 involves a client device receiving a first speech segment, where the first speech segment comprises a purchase request and where the client device is associated with a user-account, as shown in block 602. The client device then receives an image, where the image comprises at least one target-product-or-service detail, as shown in block 604. Next the client device determines a target product or service based on at least the purchase request, as shown in block 606, and the client device determines a confidence level associated with a purchase of the target product or service, as shown in block 608. If the confidence level is greater than or equal to a threshold level, then the client device sends a purchase order, via the associated user-account, for the target product or service, as shown in block 610. Otherwise, if the confidence level is less than the threshold level, then (i) the client device sends a purchase-request message comprising the purchase request and the image, shown at block 612, (ii) the client device receives a target-product-or-service identification message comprising a second target product or service, shown at block 614, and (iii) the client device sends a purchase order for the second target product or service, shown at block 616.

The method 600 may be performed using the embodiments described with respect to method 500 above.

In some embodiments, at block 604, the image may be captured by a camera on a client device, for example. More specifically, an HMD may have a POV camera that is capable of sending an image or video feed to the hybrid response system, where the image or video is indicative of what the wearer is looking at. Sending the image may occur automatically in association with the voice request or specifically at the instruction of the user. In either case, the image feed may scan for a bar code, use object recognition, or simply relay the image feed to a guide computing system to assist a guide in determining a target product or service. In some embodiments, the image may comprise contextual details related to the purchase request including, for example, at least a portion of the target product, an advertisement, a product label, product packaging, and/or a UPC bar code.

In some embodiments, the method 600 may further involve the client device determining the target product or service is further based on one or more predetermined user-preferences, as described above.

In some embodiments, the method 600 may further involve the client device determining the target product or service is further based on one or more previous purchases made via the associated user-account, also as described above.

In some embodiments, the method 600 may further involve the client device determining the target product or service is further based on one or more discounts associated with the purchase request, also as described above.

In some embodiments, the method 600 may further involve the client device receiving a target-product-or-service-detail request and the client device then sending a second speech segment comprising information related to the purchase request or a second image comprising a second target-product-or-service detail. An example second speech segment may include further product or service details, such as clothing size, color, or dates for service, among other possibilities.

In some embodiments, the method 600 may involve the client device receiving a confirmation-of-purchase message, as described above.

V. ILLUSTRATIVE APPLICATIONS

Figure 7:
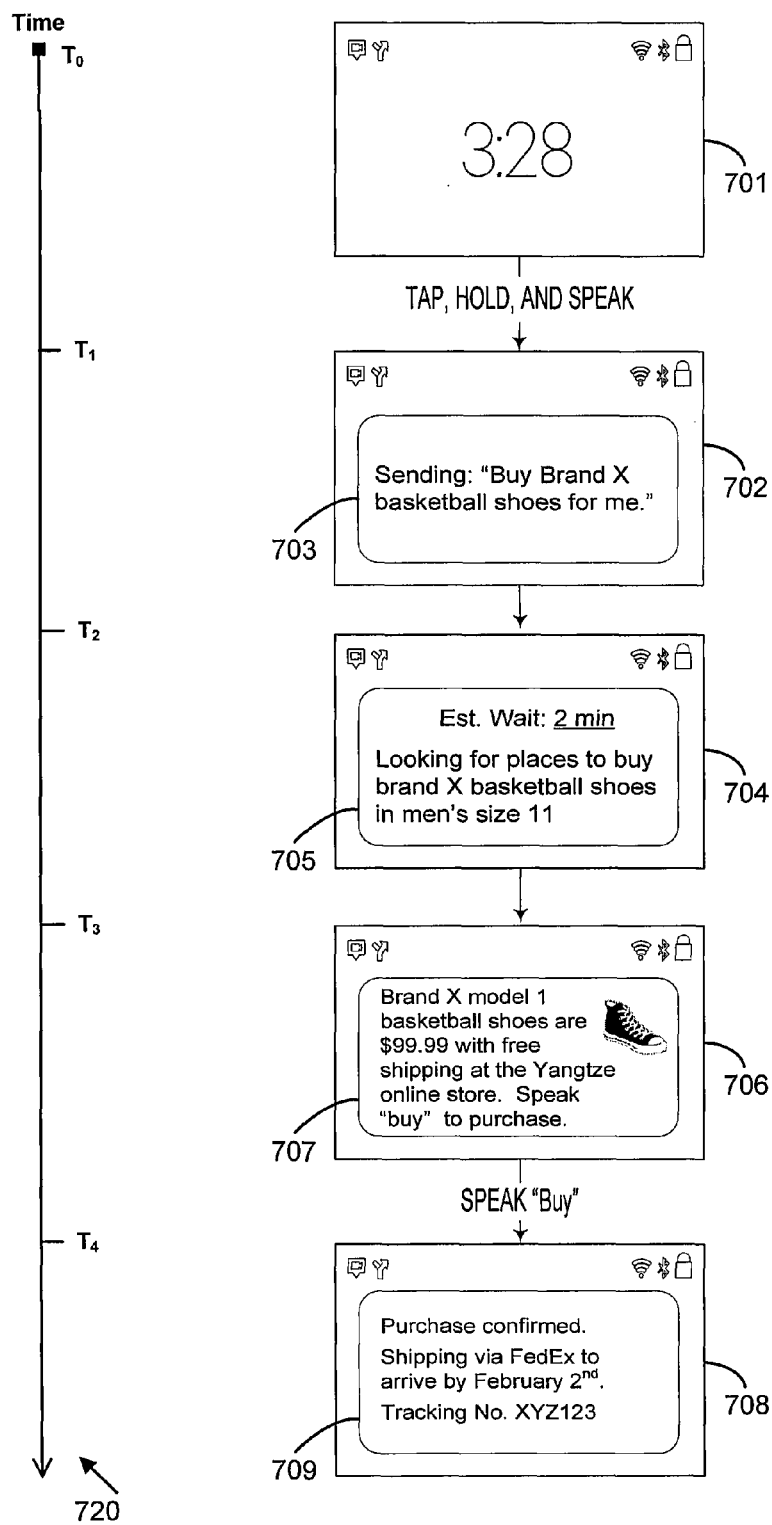
FIG. 7 is an illustration of screens from an HMD display, in accordance with an illustrative application of an example embodiment.

FIG. 7 is another illustration of screens from an HMD display, in accordance with an illustrative application of an example embodiment. In particular, FIG. 7 illustrates another scenario where an HMD user sends a first speech segment or purchase request to a hybrid response system. Note that the screens 701, 702, 704, 706, and 708 may be representative of screen shots, and may appear in the order that they might occur, in accordance with an example embodiment. As such, the approximate times $T_0$ to $T_4$ at which each screen 701, 702, 704, 706, and 708 might be displayed is indicated on a timeline 720.

As shown at time $T_0$, the HMD may display a home screen 701. And, an HMD user may initiate a voice request from the home screen 701 by tapping and holding a touchpad on their HMD, and then speaking the voice request. In the scenario illustrated in FIG. 7, the voice request is: "Buy the Brand X basketball shoes for me." When this voice request is received by the HMD, the HMD may apply a speech-to-text process to the voice request. The HMD may then display an initial request card, which includes a transcription of the spoken voice request (e.g., the literal transcription of the spoken words), along with an indication that the request is being sent to the hybrid response system. Thus, as shown at time $T_1$, the HMD may display a screen 702 with an initial request card 703 that indicates: "Sending: 'Buy the Brand X basketball shoes for me.'"

Further, at some time $T_2$ between transmission of the initial request card and receipt of a response, the HMD may display a screen 704 that includes a status card 705. The status card 705 indicates that the estimated wait time for a response from the hybrid response system is two minutes. Further, status card 705 indicates that the hybrid response system is "Looking for places to buy brand X basketball shoes in men's size 11." Note that the voice request indicated in the status card 705 may have been personalized based on user-account information that the user opted to make available to the hybrid response system. In particular, an automated process or a guide computing system may have determined from such account information (e.g., past purchases and/or stored purchasing preferences) that the particular user wears size 11 shoes.

As further shown in FIG. 7, the HMD may receive a response to the voice request from a hybrid response system and, at time $T_3$, may display a screen 706 with a response card 707. In the illustrated example, response card 707 indicates: "Brand X model 1 basketball shoes are available for $99.99 with free shipping from the Yangtze online store. Speak "buy" to purchase." In this example, a user speaks "buy," sending a purchase approval response to the hybrid response system.

In some embodiments, it is also possible that one or more additional inputs, such as a response to a product-or-service-detail request, may be required to confirm a purchase. In the scenario shown in FIG. 7, the response from the guide computing system may be selected based on context information associated with the HMD, user preferences, and/or information from an associated user-account. For example, based on such information, a guide computing system may be fairly confident that the user wants to purchase Brand X model 1 basketball shoes. However, the guide may be uncertain as to the particular store where the user would like to make the purchase and therefore send the client device a product-or-service-detail request.

As further shown in FIG. 7, the HMD may receive a confirmation message from the hybrid response system and, at time $T_4$, may display a screen 708 with a confirmation card 709. In the illustrated example, response card 709 indicates: "Purchase confirmed. Shipping via FedEx to arrive by February 2nd. Tracking No. XYZ123."

VI. CONCLUSION

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

We claim:

1. A method, comprising:
receiving, by a computing system, a speech segment, wherein the first speech-segment message is associated with a user-account;
determining, by the computing system, a translation of the speech segment;
determining, by the computing system, a translation confidence level associated with the translation;
if the translation confidence level is greater or equal to a translation threshold level, determining, by the computing system, an actionable message from the translation, including determining that the actionable message indicates a purchase request;
determining, by the computing system, an actionable-message confidence level associated with the actionable message;
if the actionable-message confidence level is greater or equal to an actionable-message threshold level, providing, by the computing system, a first determination of a target product or service in the purchase request;
determining, by the computing system, a purchase-request confidence level associated with the first determination of the target product or service;
if the purchase-request confidence level is greater than or equal to a purchase-request threshold level, purchasing, by the computing system, the target product or service via the associated user-account; and
otherwise, if the purchase-request confidence level is less than the purchase-request threshold level, sending, by the computing system, the speech segment to at least one guide computing system, the at least one guide system configured to receive input relating to the speech segment or the purchase request, provide a second determination of the target product or service based on the input, and purchase the target product or service via the associated user-account.

2. The method of claim 1, further comprising:
receiving an image at the computing system, wherein the image comprises contextual details related to the purchase request, wherein the first determination of the target product or service is further based on the image.

3. The method of claim 2, wherein the image comprises at least a portion of the target product, an advertisement, a product label, product packaging, and/or a UPC bar code.

4. The method of claim 1, wherein the first determination of the target product or service is further based on one or more predetermined user preferences.

5. The method of claim 1, wherein the first determination of the target product or service is further based on one or more previous purchases made via the associated user-account.

6. The method of claim 1, wherein the first determination of the target product or service is further based on one or more discounts associated with the purchase request.

7. The method of claim 1, wherein the at least one guide computing system is further configured to send a target-product-or-service-detail request to a client device requesting details on the target product or service, and the input for the second determination of the target product or service includes the details provided by client device.

8. The method of claim 1, further comprising:
sending, by the computing system, a purchase-approval request.

9. The method of claim 1, further comprising:
sending, by the computing system, a confirmation-of-purchase message.

10. The method of claim 1, wherein the first determination of the target product or service provided by the computing system is the same as the second determination of the target product or service provided by the at least one guide system.

11. The method of claim 1, wherein the first determination of the target product or service provided by the computing system is different from the second determination of the target product or service provided by the at least one guide system.

12. The method of claim 1, wherein the input for providing the second determination of the target product or service includes at least one of an image with contextual details related to the purchase request, one or more predetermined user preferences, one or more previous purchases made via the associated user-account, or one or more discounts associated with the purchase request.

13. A non-transitory machine-readable storage medium comprising instructions that, when executed by one or more processors of a machine, cause the machine to perform operations comprising:
receiving a speech segment, wherein the first speech-segment message is associated with a user-account;
determining a translation of the speech segment;
determining a translation confidence level associated with the translation;

if the translation confidence level is greater or equal to a translation threshold level, determining an actionable message from the translation, including determining that the actionable message indicates a purchase request;

determining an actionable-message confidence level associated with the actionable message;

if the actionable-message confidence level is greater or equal to an actionable-message threshold level, providing a first determination of a target product or service in the purchase request;

determining a purchase-request confidence level associated with the first determination of the target product or service;

if the purchase-request confidence level is greater than or equal to a purchase-request threshold level, purchasing the target product or service via the associated user-account; and otherwise, if the purchase-request confidence level is less than the purchase-request threshold level, sending the speech segment to at least one guide computing system, the at least one guide system configured to receive input relating to the speech segment or the purchase request, provide a second determination of the target product or service based on the input, and purchase the target product or service via the associated user-account.

14. The non-transitory machine-readable storage medium of claim 13, wherein the operations further comprise:

receiving an image comprising contextual details related to the purchase request, wherein the first determination of the target product or service is further based on the image.

15. The non-transitory machine-readable storage medium of claim 13, wherein the first determination of the target product or service is further based on one or more predetermined user preferences.

16. The non-transitory machine-readable storage medium of claim 13, wherein the first determination of the target product or service is further based on one or more previous purchases made via the associated user-account.

17. The non-transitory machine-readable storage medium of claim 13, wherein the first determination of the target product or service is further based on one or more discounts associated with the purchase request.

18. The non-transitory machine-readable storage medium of claim 13, wherein the at least one guide computing system is further configured to send a target-product-or-service-detail request to a client device requesting details on the target product or service, and the input for the second determination of the target product or service includes the details provided by client device.

19. The non-transitory machine-readable storage medium of claim 13, wherein the operations further comprise sending a purchase-approval request.

20. The non-transitory machine-readable storage medium of claim 13, wherein the operations further comprise sending a confirmation-of-purchase message.

21. The non-transitory machine-readable storage medium of claim 13, wherein the input for providing the second determination of the target product or service includes at least one of an image with contextual details related to the purchase request, one or more predetermined user preferences, one or more previous purchases made via the associated user-account, or one or more discounts associated with the purchase request.

* * * * *